United States Patent
Semenov et al.

(10) Patent No.: US 6,180,918 B1
(45) Date of Patent: Jan. 30, 2001

(54) METHOD FOR MAKING A WELDED JOINT

(75) Inventors: Viktor Nikonorovich Semenov, Moskovskaya oblast; Anatoly Ivanovich Grigoriev; Gennady Grigorievich Derkach, both of Moscow; Jury Vasilievich Movchan; Anatoly Lukich Loginov, both of Moskovskaya oblast, all of (RU)

(73) Assignee: Otkrytoe Aktsionernoe Obschestvo "Nauchno-Proizvodstvennoe Obiedinenie "Energomash" Imeni Akademida V.P. Glushko", Moskovskaya oblast (RU)

( * ) Notice: Under 35 U.S.C. 154(b), the term of this patent shall be extended for 0 days.

(21) Appl. No.: 09/391,862

(22) Filed: Sep. 8, 1999

(30) Foreign Application Priority Data

Feb. 4, 1999 (RU) .................................................. 99102179

(51) Int. Cl.[7] .................................................... B23K 9/23
(52) U.S. Cl. ..................................................... 219/137 WM
(58) Field of Search .................................. 219/137 WM, 219/137 R, 74, 75

(56) References Cited

U.S. PATENT DOCUMENTS 5,227,609 * 7/1993 Simon et al. .................... 219/137 R

FOREIGN PATENT DOCUMENTS 6-7934 * 1/1999 (JP) .................................. 219/137 R
585927 12/1977 (RU) .

OTHER PUBLICATIONS

I.I. Gorev, "Liquid–Propellant rocket Engine Production Basis", "Mashinostroenie" p. 61, Moscow 1969.
N.A. Akulov, "Welding Manual", "Mashinostroenie", vol. 4, p. 8, Moscow 1971.

* cited by examiner

Primary Examiner—Clifford C. Shaw
(74) Attorney, Agent, or Firm—Christie, Parker & Hale, LLP

(57) ABSTRACT

A method of making a welded joint for constructions of maraging steels consists of making a Y-shaped grooving of edges with a shrink groove in a weld seam root. The junction is assembled by tack weld using a chromium-plated filling wire at a direct polarity current. The welding is carried out by multiple runs of argon-carbon dioxide gas-shielded welding.

3 Claims, 1 Drawing Sheet

METHOD FOR MAKING A WELDED JOINT

FIELD OF THE INVENTION

The invention relates to the field of welding, in particular to a method for making welded joints of maraging steel constructions, and can find application in the manufacturing of, for example, high-pressure pipelines operating at cryogenic temperatures that are mainly used for generator units of rocket engines.

BACKGROUND OF THE INVENTION

A method of gas-shielded welding is known, which is used for protecting melted metal of a weld against the unfavorable effect of atmospheric air (I.I. Gorev "Basics of Producing Liquid-Propellant Rocket Engines," Moscow, 1969, page 61).

It is known that welding maraging steels and alloys with a high volumetric effect of polymorphic transformation requires that a number of measures be taken to prevent cracking of welded joints, loss of material strength, etc., which measures are, for example, assembling with tack welds and filling the grooves by multiple-run welding ("Welding Manual," edited by N. A. Akulov, Mashinostroenie publishing house, 1971, v. 4, pp. 3–11, 46–84, 93–127).

A method is known for making a welded joint of constructions, including grooving edges of parts for welding, thus forming a Y-shaped form when the edges of the parts are put together, filling the grooves by electric arc gas-shielded welding (USSR Inventor's Certificate No. 5852927, B 23 K 9/02, published 1977). However, grooving the edges of the part for welding with only a Y-shaped form does not make it possible to obtain a highquality connection, especially in the case of parts made of maraging steels.

SUMMARY OF THE INVENTION

The object of the present invention is to increase the quality of a welded joint of parts that are made of maraging steel.

The technical result that may be achieved upon use of the present invention is to obtain a welded joint, when welding parts made of maraging steel, that has high-strength properties without cracks.

In order to achieve the stated object in a method for making a welded joint, which includes the steps of grooving edges of parts for welding, assembling the joint to be welded with tack welds and filling the grooves by multiple-run welding, the edges during the grooving being made Y-shaped and a shrink groove being made in a weld root, the tack welds are made by manual argon-arc welding with a chromium-plated filling wire and direct polarity current, the first run when filling the grooves is made by argon-arc welding using a tungsten electrode with the chromium-plated filling wire and direct polarity current, the second and subsequent, except for the last, runs by automatic helium arc welding with reverse polarity current, the last run by automatic gas-shielded arc welding using a mixture of 50% argon and 50% carbon dioxide as the shielding gas with reverse polarity current, with the attainment of a strengthened weld seam. After each run the weld seam is scraped.

DETAILED DESCRIPTION OF THE PREFERRED EMBODIMENTS

Figure 1:
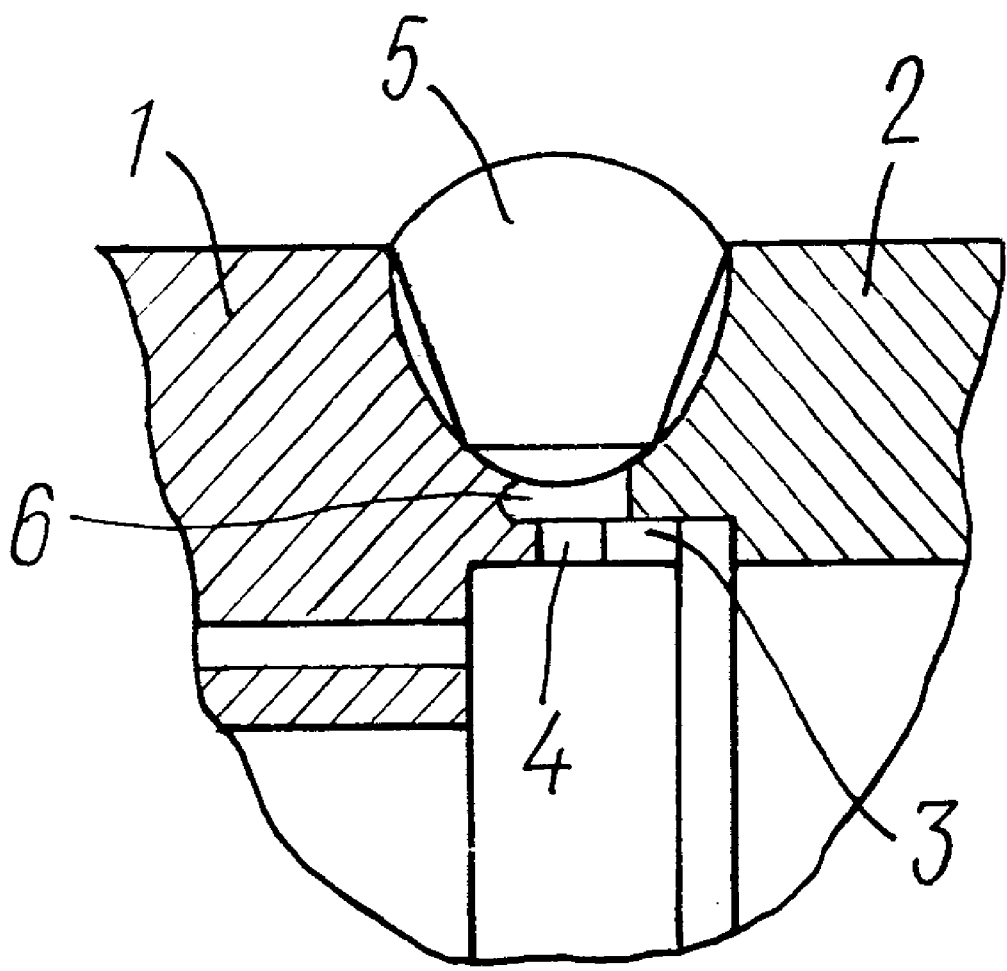
FIG. 1 shows a welding diagram, wherein 1 and 2 are parts to be welded, 3 is a perforated backing plate made as a single unit with the part 1, 4 is one of the holes in the perforated backing plate 3 for an argon blow through parts 1 and 2, 5 is a weld seam, 6 is a shrink groove.

The proposed method was used for welding a generator with a stator of maraging steel. The assembly of parts 1 and 2 that have junction edges forming a Y-shaped form of grooves in the junction plane of parts 1 and 2, the vertical part of the Y-shaped form being in the plane of a weld seam 5 and directed to its root, was carried out with tack welds made by manual argon-arc welding using a filling wire, chromium plated with a 10–30 $\mu$m layer, with an argon blow of the inner spaces of the system and direct polarity current. Wherein, a perforated backing plate 3, necessary for feeding argon through perforation holes to the welding zone and preventing the ingress of melt into the main line, was disposed on a gas generator. After welding, the perforated backing plate 3 remains in the welded joint. While grooving the edges of parts 1 and 2, a shrink groove 6 is made in the vertical part of the Y-shaped form for the root of the weld seam 5.

Welding with multiple runs was carried out. Wherein, the first run was carried out by automatic argon welding at a current of direct polarity with a side feed of a welding chromium-plated filling wire and with internal argon blowing of the inner space of the pipeline through a connection on the generator. After the first run, the weld seam 5 was mechanically scraped and subsequently wiped with a degreasing agent chladon 113. The second run was carried out by automatic helium welding at a reverse polarity current using a filling wire and with an internal argon blow. The weld seam was mechanically scraped. The third and subsequent runs (6–8 runs) were carried out by automatic helium welding using a filling wire. The polarity was reverse. The weld seam was mechanically scraped after each run. The last run was carried out by automatic gas-shielded welding with a filling wire. A mixture of 50% argon and 50% carbon dioxide was used for gas-shielding. This procedure was used to achieve an optimum bath fluidity, which ensures dense filling of the grooves in the weld seam 5 and prevents the appearance of porosity and cracks in the weld seam 5. The strength of the weld seam 5 is increased from 0.5 to 3.5 mm. In the case of direct polarity the part 1 and/or 2 is connected to the positive pole, the electrode—to the negative pole. In the case of reverse polarity—vice versa: the part 1 and/or 2—to the negative pole, the electrode—to the positive pole.

Ultrasonic testing was conducted on the weld seams 5 after welding. The test showed high quality of the obtained connection, no cracks, both in the weld seam and in the weld affected zone.

The proposed method can be most successfully used for welding constructions of maraging steels, for example, high-pressure pipelines operating at cryogenic temperatures, primarily for generator units of rocket engines.

What is claimed is:

1. A method for making a welded joint, including the following steps:

grooving edges of parts for welding with formation of a junction of Y-shaped form when the edges of the parts are placed adjacent one another, making a shrink groove for a weld seam root during said grooving of said part edges, assembling a joint being welded by tack welding prior to filling the junction, the tack welding being carried out by manual argon-arc welding with direct polarity current using a non-consumable electrode and chromium-plated filling wire, that is fed into the weld seam root, filling the junction by means of multi-run automatic electric arc welding using a chromium-plated filling wire that is fed into the weld seam root, making a first run with a tungsten non-consumable electrode in an argon medium with direct polarity current, making a second and subsequent runs with a consumable electrode in a helium medium with reverse polarity current, making a last run with a consumable electrode in a mixture of shielding gases consisting of 50% argon and 50% carbon dioxide with reverse polarity current.

2. A method according to claim 1, wherein mechanical scraping of the weld seam is carried out after each run.

3. A method according to claim 1, wherein prior to assembling a joint being welded by tack welding, one of the parts is provided with a perforated backing plate for feeding argon through its holes to the welding zone, the backing plate being joined to the part by welding or made as a single unit with it.

* * * * *